United States Patent Office 2,694,032
Patented Nov. 9, 1954

2,694,032

PROCESS FOR ISOLATING PROTEOLYTIC ENZYME AND SUSPENDED MATTER IN FICUS LATEX

Alphonse Walti, Fullerton, Calif.

No Drawing. Application September 28, 1951,
Serial No. 248,861

1 Claim. (Cl. 195—66)

The present invention relates to a process of separating and recovering the suspended matter and the enzyme components of Ficus latex.

The latex of certain species of the genus Ficus has long been known for its anthelmintic properties, which, as disclosed by more recent investigations, are due to the proteolytic action of an enzyme constituent of the milky fluid. Physically, a latex of this type consists of a liquid phase and a suspensoid of relatively uniform particle size. The suspensoid has been defined at various times as a rubber or wax, but I have found it to be predominantly a non-hydrocarbon, in contrast to the hydrocarbons of rubber latex.

Several processes have been disclosed of separating the suspensoid in order to enable the recovery of the anthelmintic principle or proteolytic enzyme from the liquid phase of Ficus latex. These processes comprise means such as settling, centrifugation, or filtration without filter aid. However, all these processes are extremely slow and inefficient. Centrifugation, for example, at 2,000 R. P. M. for one hour does not show any separation whatsoever of the fresh latex, usually having a pH of about 4. According to my Patent No. 2,163,643 of June 27, 1939, entitled "Process for Producing Proteolytic Enzyme From Ficus Latex," which discloses the recovery of the enzyme in crystalline form, the addition of filter aid, such as infusorial earth, facilitates the filtration and gives a clear solution, but makes it impractical to recover the valuable gummy material. Moreover, after removal of the suspensoid by means of any of the foregoing methods, the enzyme is recovered from the clear liquid, although it is doubtful that the enzyme is confined to the liquid phase only. It has been found that the particles constituting the suspensoid of latices of this type are surrounded by a protein film and in my afore-mentioned patent I have established the protein nature of the proteolytic enzyme in Ficus latex.

Now I have discovered a way of treating Ficus latex which not only greatly facilitates the separation of the suspended matter from the liquid portion, but enables me to recover the valuable gum, aside from a quantitative increase in the recovered enzyme. Although I do not wish to be limited by any theory, it is my belief that the herein disclosed treatment of the latex does not only permit the separation of the suspensoid from the liquid phase, but that, as a result of this treatment, the protein film surrounding the dispersed particles is being removed and brought into a more soluble state, which accounts not only for the ease of separation, but also for the increase in enzyme yield.

The treatment consists in adjusting the pH value of the latex to above 6.0 by means of carefully adding an alkaline agent, such as ammonia or sodium hydroxide solution. Alkalinity must be avoided if it is desired to recover the proteolytic enzyme in its active state. A change in the structure of the latex takes place upon such treatment, as indicated by a manifold reduction in the viscosity. As a result of this change the liquid portion and the gummy material can be readily separated from each other by means of a centrifuge.

Individual samples of Ficus latex vary considerably in their initial viscosity, depending upon species, soil, or climatic conditions. However, the observed drop in viscosity upon an increase in the pH value of the latex is a general characteristic.

Latices A and B in the table below are typical examples:

| Latex A | | Latex B | |
|---|---|---|---|
| pH | relative viscosity [1] | pH | relative viscosity [1] |
| 4.1 | 31.5 | 3.9 | 15.2 |
| 4.6 | 30.9 | 4.3 | 14.3 |
| 5.6 | 21.5 | 4.8 | 11.7 |
| 7.0 | 5.1 | 5.2 | 10.1 |
| | | 5.9 | 6.0 |
| | | 6.4 | 3.4 |

[1] As measured with the Ostwald viscometer, based on the viscosity of water being 1.

As can be seen from the foregoing table, by means of increasing the pH value from 4.1 to 7.0, latex A which originally was 31.5 times as viscous as water, is reduced to a viscosity of only 5.1 times that of water or to about one-sixth of its original viscosity. Latex B which originally was only about one-half as viscous as latex A, is reduced to about one-fourth of its initial viscosity upon a pH increase from 3.9 to 6.4.

The ease with which a separation of the solids from the liquid of Ficus latex can be carried out after the foregoing pH adjustment is demonstrated by simultaneously centrifuging in opposite containers a sample of treated latex and a sample of the same latex without treatment. In the case of the untreated latex no separation whatsoever occurs upon centrifuging for 30 minutes, while the treated sample shows a sharp separation into a solid, white top layer, and an aqueous, brownish bottom layer. Continuing the centrifugation for another 90 minutes does not produce any separation in the untreated sample. On the other hand, after adjusting the pH value in the described manner, separation of the suspensoid from the liquid fraction can be observed at a sample left standing over night.

Having described my invention, I claim:

A process for the separation and recovery of proteolytic enzyme and suspended gummy material contained in Ficus latex, which comprises materially reducing the relative viscosity of the unfiltered, natural latex by adding in the cold an amount of a dilute alkaline agent sufficient to adjust the pH value to between 6–7, subjecting the latex to centrifugation for about 30 minutes to separate the solid constituents from the liquid of the latex and recovering said gummy material in the solids and said proteolytic enzyme in the liquid.

References Cited in the file of this patent

UNITED STATES PATENTS

| Number | Name | Date |
|---|---|---|
| 894,490 | Foelsing | July 28, 1908 |
| 2,162,737 | Major et al. | June 20, 1939 |
| 2,163,643 | Walti | June 27, 1939 |
| 2,398,613 | Braak | Apr. 16, 1946 |

FOREIGN PATENTS

| Number | Country | Date |
|---|---|---|
| 293,771 | Great Britain | Oct. 10, 1929 |